July 1, 1947.  E. C. OLSEN  2,423,402
AWNING SUPPORTING FRAME AND ADJUSTABLE CONNECTOR THEREFOR
Filed Feb. 20, 1945
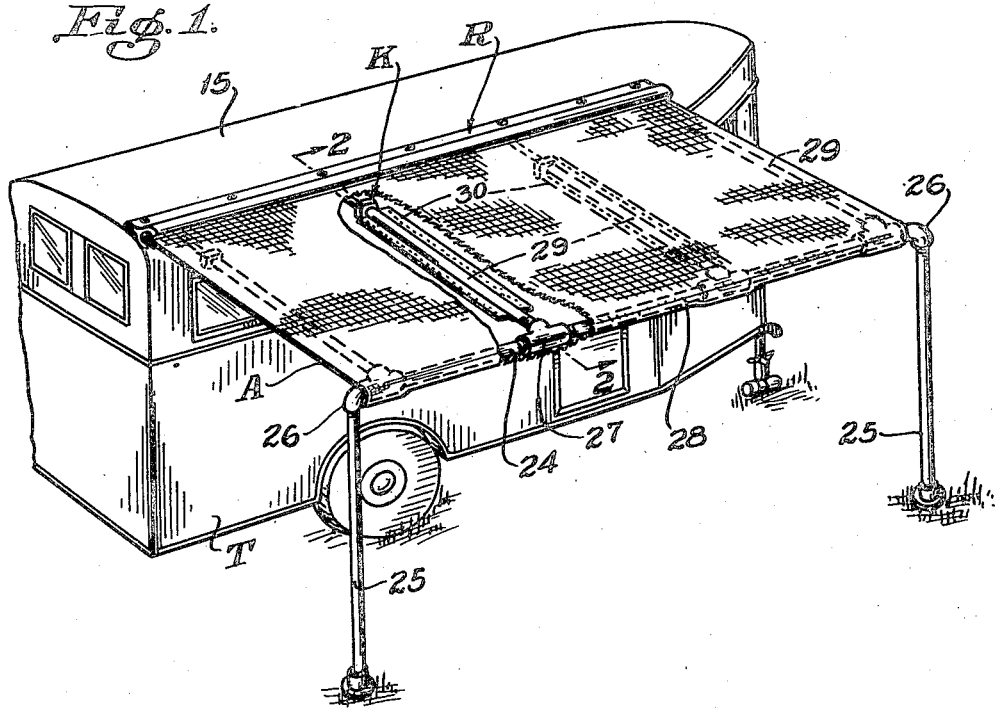
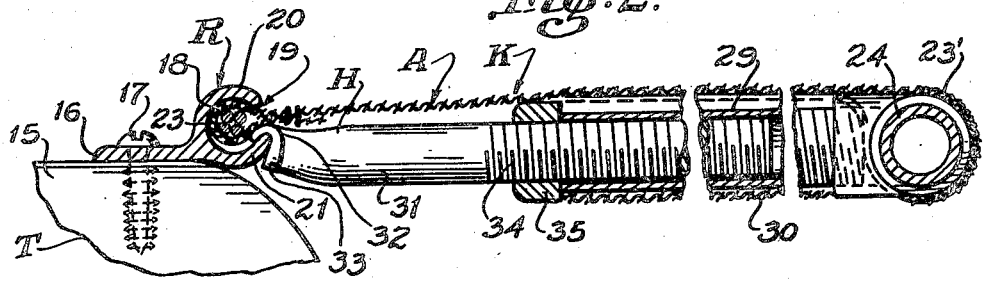
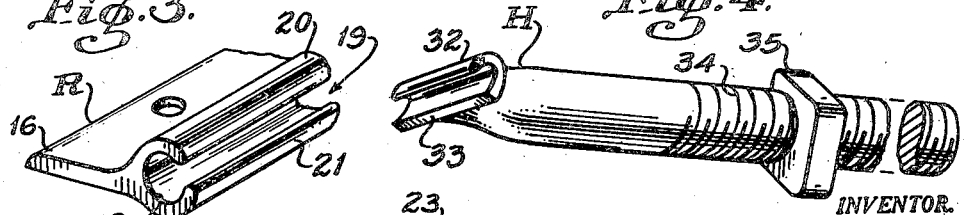
INVENTOR.
ELMER C. OLSEN
BY
Edwin R. Jones
ATTORNEY.

Patented July 1, 1947

2,423,402

UNITED STATES PATENT OFFICE 2,423,402

AWNING SUPPORTING FRAME AND ADJUSTABLE CONNECTOR THEREFOR

Elmer C. Olsen, Monterey Park, Calif.

Application February 20, 1945, Serial No. 578,884

8 Claims. (Cl. 135—5)

My invention relates to supporting frames for awnings, and it has particular reference, although not necessarily, to that character of frame used for supporting the awnings of house trailers, which is detachable from the trailer and collapsible for storage. Specifically, my invention relates to house trailer awning supporting frames of that type which includes an attaching rail secured permanently on the roof of the trailer and having a channel therein in which a beaded inner longitudinal edge of the awning sheet is received and thus attached to the trailer roof, and by the use of pipes or rods supported on the ground or on the trailer, the awning sheet is supported in extended position from the rail at the side of the trailer.

In such awning supporting frames no provision is made, which is applicable to the standard channeled rail, for supporting the awning transversely at the side of the trailer, thus necessitating the use of additional means such as brackets, which must be secured to the trailer body independently of the rail.

It is a purpose of my invention to provide an awning supporting frame which embodies first elements in the form of rods or pipes, co-acting with the conventional roof rail to support the awning in elevated position longitudinally, and other elements for supporting the awning transversely, and which other elements are directly attachable to the roof rail and adjustable to render them extensible so as to support the awning in fully extended position at the side of the trailer, and to lend rigidity to the supporting frame as a whole.

It is also a purpose of my invention to provide a coupler or connector for each transverse supporting element of the frame, which functions to connect the element to the conventional roof rail without necessitating structural modification of the latter, and which connector is adjustable to vary the effective length of the element, so that by employing a plurality of these connectors and elements, the awning can be readily attached to the roof rail, and by proper adjustment caused to effectively support the awning in fully extended position, and the entire frame given such rigidity as to prevent accidental collapsing.

I will describe only one form of awning supporting frame and only two forms of adjustable connectors, each embodying my invention, and will then point out the novel features thereof in claims.

In the accompanying drawings:

Fig. 1 is a view showing in perspective one form of awning supporting frame embodying my invention in applied position to a house trailer.

Fig. 2 is an enlarged transverse sectional view taken on the line 2—2 of Fig. 1.

Fig. 3 is a fragmentary perspective view of the roof rail.

Fig. 4 is a fragmentary perspective view of the connector.

Fig. 5 is a fragmentary sectional view, similar to Fig. 2, showing another form of connector embodying my invention.

Referring specifically to the drawings, my invention in its present embodiment comprises a frame for supporting an awning sheet A at one side of a house trailer T, which includes a rail R secured to the roof 15 of the trailer. This rail R is of conventional construction and includes an attaching flange 16 through which screws 17 extend at intervals along the length of the flange for permanently securing the rail longitudinally to the roof 15 adjacent one longitudinal edge thereof.

The rail R is substantially circular in cross-section to provide a channel 18 longitudinally therein. A slot 19 is formed in the rail leading into the channel, and dividing the rail in an upper portion 20 and a lower portion 21. As applied to the roof 15 the slot 19 is presented to the side of the trailer, and the rail portion 21 rises slightly from the edge of the roof, as best illustrated in Fig. 2.

The rail R is adapted to receive one longitudinal edge of an awning sheet A, and by securing in such edge a rope or cable 23 the sheet edge becomes beaded and can be detachably secured within the channel 18 of the rail. As can be seen from Fig. 2, the rope 23 is arranged longitudinally within the rail and is of such diameter as to prevent its displacement from the rail through the slot 19. The other longitudinal edge 23 of the awning sheet carries a frame element 24 coextensive in length therewith and connected at its ends to upright elements 25. The elements 24 and 25 may be in the form of pipes connected at their confronting ends by elbows 26 so as to permit detachment of the elements from each other. The element 24 may be made up of sections of pipes threadedly connected by T-fittings 27, and these fittings and pipe sections may be secured to the longitudinal edge of the awning sheet by looping and stitching the sheet to form a sleeve 28.

From the preceding description, it will be clear that the elements 24 and 25 serve to support the outer longitudinal edge of the awning sheet in elevated position above the ground.

To support the awning sheet between the element 24 and the rail R, one or more transverse elements 29 in the form of pipes or the like are provided. In each instance the outer end of the elements 29 are connected to the corresponding T-fitting 27, while the opposite end is provided with a connector designated generally at K which is designed for attachment to the rail R. These elements 29 may be secured to the underside of the awning sheet A by providing the latter with sleeves 30 stitched to the sheet and of a diameter to receive the element.

The construction of each connector K is such as to be readily attachable to the rail R, and to be adjusted to vary the effective length of the element 29 so that the latter is placed under tension to hold the awning sheet in fully extended position at the side of the trailer.

In the form of connector K shown in Figs. 1 and 2, it comprises a rod 31, one end of which is of a diameter to be freely received in the element 29. The other end of the rod is deformed and shaped to provide a head H having an upper curved portion 32 and a lower substantially straight portion 33. The rod 31 is screw threaded as at 34 to receive a nut 35 where the rod projects from the element 29, and to have bearing engagement with the adjacent end of the element.

In the applied position of the connector K to the rail R the head H is engageable with the rail at a point beneath the awning sheet A, the curved portion 32 engaging the upper edge of the rail portion 21, and the head portion 33 being disposed to the outer side of the portion 21, and clear of the adjacent edge of the roof 15. By adjustment of the nut 35 on the rod 31 so as to force the element 29 outwardly on the rod, the rod is forced in the opposite direction to maintain the head H in engagement with the rail R and the element 29 in such extended position as to maintain the awning sheet fully extended from the roof of the trailer.

Thus it will be understood that by proper adjustment of the connectors for each of the elements 29 not only is the awning sheet held in extended position but the frame as a whole is rendered rigid to effectively support the awning and without the possibility of the frame collapsing. In addition, the connectors K provide quick detachment of the supporting frame from the rail, so that frame can be demounted and collapsed for storage.

My connector K, with slight modification, is applicable to awning supporting frames in which the element 24 is not used. In such case some means is necessary to secure the elements 29 against shifting longitudinally on the rail R. In Fig. 5, I have shown a second form of connector which is identical to the first form with the exception that the head portion 33 is provided with a plurality of set screws 36 adjustable to engage the rail portion 21 and secure the head against shifting lengthwise on the rail. In consequence, the element 29 cannot lose its perpendicular position with respect to the rail R.

Although I have herein shown and described only one form of awning supporting, and two forms of connectors, each embodying my invention, it is to be understood that various changes and modifications may be made therein without departing from the spirit of my invention and the spirit and scope of the appended claims.

I claim:

1. In combination: a longitudinally channeled rail adapted to be secured to a supporting structure; an awning of sheet form having a bead on one edge thereof received in the channel of said rail for securing said edge to the rail; means associated with the opposite edge of said awning and coacting with said rail to support said awning in elevated position at one side of the structure; and means secured to said awning extending between said edges thereof, and detachably engaging within the channel of said rail for so spacing the first mentioned means from the structure as to hold said awning in extended position from the structure.

2. A combination as embodied in claim 1, wherein the second mentioned means is extensible to hold said awning fully extended from said structure.

3. In combination: a longitudinally channeled rail adapted to be secured to a supporting structure; an awning of sheet form having a bead on one edge thereof received in the channel of said rail for securing said edge to the rail; means associated with the opposite edge of said awning and coacting with said rail to support said awning in elevated position at one side of the structure; and means secured to said awning extending between said edges thereof, and detachably engaging within the channel of said rail for supporting said awning in fully extended position from said structure.

4. In an awning supporting frame; a channeled rail; and a member arranged at right angles to said rail having a head engaging said rail, and extensible parts for varying the length of said member.

5. In an awning supporting frame: a rail of substantially circular form in cross section, and having a slot lengthwise therein; and a member perpendicular to said rail and including a head engaging said rail within said slot, and extensible parts for varying the length of said member.

6. In an awning supporting frame: a rail of substantially circular form in cross section, and having a slot lengthwise therein; and a member having one part provided with a head engaging said rail within said slot, a second part axially alined with said first part, and rotatable means connecting said parts for varying the combined length of said parts.

7. As an article of manufacture, an awning frame member including: one part provided with a head adapted for engagement with a supporting rail; a second part axially alined with said first part; and rotatable means connecting said parts for varying the combined length of said parts.

8. As an article of manufacture, an awning frame member including: a rod; a head of arcuate form in cross section, on one end of said rod; a tube receiving the other end of said rod; and a nut threaded on said rod and engaging said tube for adjusting said rod lengthwise in said tube.

ELMER C. OLSEN.

REFERENCES CITED

The following references are of record in the file of this patent:

UNITED STATES PATENTS

| Number | Name | Date |
| --- | --- | --- |
| 1,483,741 | Moffett | Feb. 12, 1924 |
| 2,215,680 | Ward | Apr. 6, 1943 |
| 359,795 | Lewis | Mar. 22, 1887 |
| 2,189,567 | Miller | Feb. 6, 1940 |
| 357,043 | Scofield | Feb. 1, 1887 |